US012670862B2

(12) United States Patent
Pyo

(10) Patent No.: US 12,670,862 B2
(45) Date of Patent: Jun. 30, 2026

(54) DISPLAY DEVICE, DRIVING METHOD, AND ELECTRONIC DEVICE

(71) Applicant: SAMSUNG DISPLAY CO., LTD., Yongin-si (KR)

(72) Inventor: Si Beak Pyo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/243,057

(22) Filed: Jun. 19, 2025

(65) Prior Publication Data

US 2026/0105889 A1 Apr. 16, 2026

(30) Foreign Application Priority Data

Oct. 15, 2024 (KR) ........................ 10-2024-0140313

(51) Int. Cl.
*G09G 3/3233* (2016.01)
*G09G 3/20* (2006.01)
*G09G 3/32* (2016.01)

(52) U.S. Cl.
CPC ......... *G09G 3/3233* (2013.01); *G09G 3/2007* (2013.01); *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
CPC ...... G09G 3/3233; G09G 3/2007; G09G 3/32; G09G 2300/0819; G09G 2300/0842; G09G 2300/0861; G09G 2310/08; G09G 2320/0233
USPC .................................................... 345/691, 76
See application file for complete search history.

(56) References Cited

U.S. PATENT DOCUMENTS 10,733,932 B2 8/2020 Pyo et al.
10,810,942 B2 10/2020 Pyo et al.
10,930,208 B2 2/2021 Pyo et al.
10,997,909 B2 5/2021 Pyo et al.
11,282,432 B2 3/2022 Pyo et al.
11,322,075 B2 5/2022 Pyo et al.
2013/0127924 A1* 5/2013 Lee ...................... G09G 3/2025 345/82
2020/0074921 A1* 3/2020 Peng .................... G09G 3/3208
2021/0201758 A1* 7/2021 Pyo .......................... G09G 5/10
2022/0036814 A1* 2/2022 Hwang ................ G09G 3/3208
2022/0068224 A1* 3/2022 Park ..................... G09G 3/3233

FOREIGN PATENT DOCUMENTS

CN 111724731 A 9/2020
CN 113053294 A 6/2021
KR 10-2537993 B1 6/2023

* cited by examiner

*Primary Examiner* — Jimmy H Nguyen
(74) *Attorney, Agent, or Firm* — F. CHAU & ASSOCIATES, LLC

(57) ABSTRACT

A display device includes a plurality of pixels, an emission driver configured to provide emission signals that control light emitting periods of the pixels, and an emission signal adjustment circuit configured to adjust at least one of a waveform of the emission signals and a timing of the emission signals. The emission signal adjustment circuit adjusts the at least one of the waveform of the emission signals and the timing of the emission signals based on a maximum luminance of the display device and grayscales of an input image.

20 Claims, 14 Drawing Sheets

FIG. 12

164

| DBV | TH2 | TH4 | TH3 | TH1 |
|---|---|---|---|---|
| 2175 | 6 | 4 | 2 | 0 |
| 1600 | 7 | 5 | 3 | 0 |
| 1200 | 8 | 6 | 3 | 0 |
| 650 | 10 | 7 | 4 | 0 |
| 300 | 14 | 10 | 6 | 0 |
| 200 | 17 | 12 | 7 | 1 |
| 100 | 23 | 17 | 10 | 2 |
| 90 | 24 | 18 | 11 | 2 |
| 60 | 29 | 21 | 13 | 2 |
| 30 | 40 | 29 | 18 | 3 |
| 15 | 55 | 40 | 24 | 4 |
| 10 | 66 | 48 | 29 | 5 |
| 4 | 99 | 72 | 44 | 8 |

DISPLAY DEVICE, DRIVING METHOD, AND ELECTRONIC DEVICE

CROSS-REFERENCE TO RELATED APPLICATION

The application claims priority under 35 U.S.C. § 119 to Korean Patent Application No. 10-2024-0140313, filed on Oct. 15, 2024, which is incorporated by reference herein in its entirety.

TECHNICAL FIELD

Embodiments of the present inventive concept relate to a display device, a driving method, and an electronic device.

DISCUSSION OF RELATED ART

With the advancement of information technology, display devices are increasingly used as mediums connecting users with information. As a result, the use of various types of display devices, including liquid crystal displays (LCDs) and organic light-emitting diode (OLED) displays, is on the rise.

As display devices become more sophisticated in their configuration, they may experience undesirable interference among the various signals within the system

SUMMARY

Embodiments of the present inventive concept provide a display device, a driving method, and an electronic device capable of alleviating the band mura phenomenon.

According to an embodiment of the present inventive concept, a display device includes a plurality of pixels, an emission driver configured to provide emission signals that control light emitting periods of the pixels, and an emission signal adjustment circuit configured to adjust at least one of a waveform of the emission signals and a timing of the emission signals. The emission signal adjustment circuit adjusts the at least one of the waveform of the emission signals and the timing of the emission signals based on a maximum luminance of the display device and grayscales of an input image.

In an embodiment, the pixels include light-emitting elements. In addition, the display device further includes a scan driver configured to provide scan signals that control a timing at which an anode initialization voltage is applied to anode electrodes of the light-emitting elements. In addition, the emission signal adjustment circuit adjusts the emission signals such that a time point at which a voltage level of an emission signal among the emission signals changes is further away from a time point at which a voltage level of a corresponding scan signal changes.

In an embodiment, the emission driver sequentially changes an emission signal among the emission signals to a first voltage level, a second voltage level greater than the first voltage level, and a third voltage level greater than the second voltage level. In addition, the emission signal adjustment circuit adjusts the emission signal such that a period during which the emission signal is maintained at the second voltage level increases.

In an embodiment, the emission signal adjustment circuit adjusts the emission signals such that a slew rate of an emission signal among the emission signals is reduced.

In an embodiment, the emission signal adjustment circuit includes a reference color selection circuit configured to select a reference color based on a difference value between an anode initialization voltage and a power source voltage applied to a cathode electrode of light-emitting elements of the pixels.

In an embodiment, the emission signal adjustment circuit further includes an average grayscale calculation circuit configured to calculate an average grayscale by calculating an average value of grayscales corresponding to the reference color among the input image.

In an embodiment, the emission signal adjustment circuit further includes an adjustment decision circuit configured to determine whether to adjust the emission signals based on the average grayscale and the maximum luminance.

In an embodiment, the adjustment decision circuit determines a first threshold value and a second threshold value based on the maximum luminance, and adjusts the at least one of the waveform of the emission signals and the timing of the emission signals when the average grayscale corresponds to a value between the first threshold value and the second threshold value.

In an embodiment, the adjustment decision circuit determines a difference between the first threshold value and the second threshold value to be smaller as the maximum luminance increases.

In an embodiment, the adjustment decision circuit further determines a third threshold value and a fourth threshold value corresponding to values between the first threshold value and the second threshold value, and adjusts the at least one of the waveform of the emission signals and the timing of the emission signals to a maximum value when the average value corresponds to a value between the third threshold value and the fourth threshold value.

According to an embodiment of the present inventive concept, a method of driving a display device includes receiving a maximum luminance of the display device and grayscales of an input image, adjusting at least one of a waveform of emission signals and a timing of the emission signals based on the maximum luminance and the grayscales, and providing the emission signals to a plurality of pixels.

In an embodiment, the pixels include light-emitting elements, and the method further includes providing scan signals that control a timing at which an anode initialization voltage is applied to anode electrodes of the light-emitting elements. In addition, adjusting the at least one of the waveform of the emission signals and the timing of the emission signals includes adjusting the emission signals such that a time point at which a voltage level of an emission signal among the emission signals changes is further away from a time point at which a voltage level of a corresponding scan signal changes.

In an embodiment, an emission signal among the emission signals is sequentially changed to a first voltage level, a second voltage level greater than the first voltage level, and a third voltage level greater than the second voltage level. In addition, adjusting the at least one of the waveform of the emission signals and the timing of the emission signals includes adjusting the emission signals such that a period during which the emission signal is maintained at the second voltage level increases.

In an embodiment, adjusting the at least one of the waveform of the emission signals and the timing of the emission signals includes adjusting the emission signals such that a slew rate of an emission signal among the emission signals is reduced.

In an embodiment, adjusting the at least one of the waveform of the emission signals and the timing of the emission signals includes selecting a reference color based on a difference value between an anode initialization voltage and a power source voltage applied to a cathode electrode of light-emitting elements of the pixels.

In an embodiment, adjusting at least one of the waveform of the emission signals and the timing of the emission signals further includes calculating an average grayscale by calculating an average value of grayscales corresponding to the reference color among the input image.

In an embodiment, adjusting the at least one of the waveform of the emission signals and the timing of the emission signals further includes determining whether to adjust the emission signals based on the average grayscale and the maximum luminance.

In an embodiment, determining whether to adjust the emission signals includes determining a first threshold value and a second threshold value based on the maximum luminance, and the at least one of the waveform of the emission signals and the timing of the emission signals is adjusted when the average grayscale corresponds to a value between the first threshold value and the second threshold value.

According to an embodiment of the inventive concept, an electronic device includes a processor, a memory having stored application programs for execution by the processor, a display device, and a user interface. The display device includes a plurality of pixels, an emission driver configured to provide emission signals that control light emitting periods of the pixels, and an emission signal adjustment circuit configured to adjust at least one of a waveform of the emission signals and a timing of the emission signals. The emission signal adjustment circuit adjusts the at least one of the waveform of the emission signals and the timing of the emission signals based on a maximum luminance of the display device and grayscales of an input image. The user interface is configured to sense user input via touch or cursor select of an icon presented on the display device. The processor is caused to execute one or more of the stored application programs upon receipt of the user input.

In an embodiment, the pixels include light-emitting elements, and the display device further includes a scan driver configured to provide scan signals that control a timing at which an anode initialization voltage is applied to anode electrodes of the light-emitting elements. In addition, the emission signal adjustment circuit adjusts the emission signals such that a time point at which a voltage level of an emission signal among the emission signals changes is further away from a time point at which a voltage level of a corresponding scan signal changes.

BRIEF DESCRIPTION OF THE DRAWINGS

The above and other features of the present inventive concept will become more apparent by describing in detail embodiments thereof with reference to the accompanying drawings.

FIG. 12 is a diagram illustrating a lookup table of the emission signal adjustment circuit of FIG. 11 according to an embodiment of the present inventive concept.

DETAILED DESCRIPTION OF THE EMBODIMENTS

Figure 1:
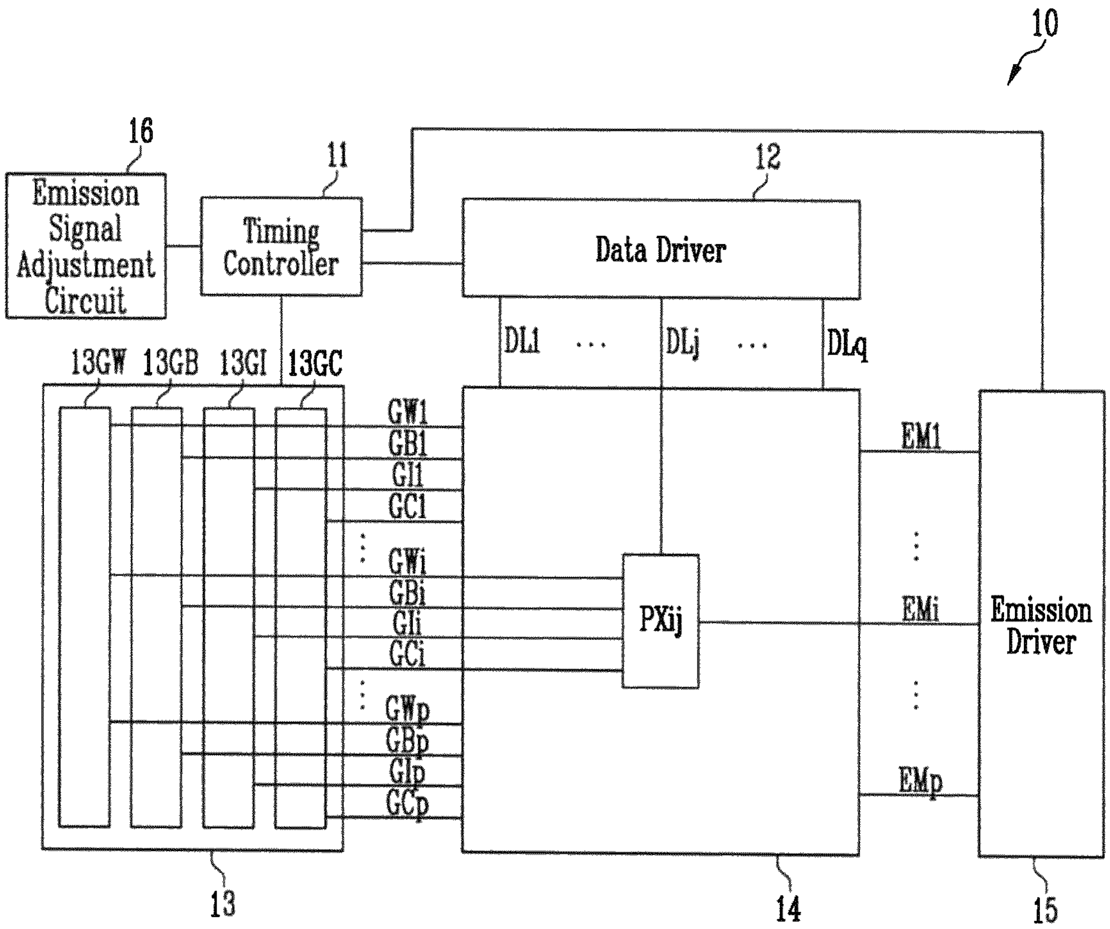
FIG. 1 is a diagram illustrating a display device according to an embodiment of the present inventive concept.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second"element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art, for example, within ±30%, 20%, 10% or 5% of the stated value. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Embodiments of the present inventive concept relate to improving the performance of a display device by dynamically adjusting the emission signals according to specific parameters of the display device and input images. For example, embodiments may include an emission signal adjustment circuit that is capable of altering the waveform and/or the timing of the emission signals. These adjustments may be determined by the maximum luminance of the display device and the grayscale levels of the input image. As a result, visual irregularities such as the band mura phenomenon may be effectively managed, reduced, and prevented.

Embodiments of the present inventive concept provide a display device capable of maintaining improved visual quality across various content types and viewing conditions. The flexibility provided by the adjustable settings enables the display device to respond to real-time variations in displayed content and environmental factors. Such capabilities not only improve the user experience by delivering clearer and more stable visual outputs, but may also contribute to more efficient power consumption and extended operational durability of the display.

FIG. 1 is a diagram illustrating a display device according to an embodiment of the present inventive concept.

Referring to FIG. 1, a display device 10 according to an embodiment of the present inventive concept may include a timing controller 11 (also referred to as a timing controller circuit), a data driver 12 (also referred to as a data driver circuit), a scan driver 13 (also referred to as a scan driver circuit), a display panel 14, an emission driver 15 (also referred to as an emission driver circuit), and an emission signal adjustment circuit 16.

The timing controller 11 may receive grayscales for an input image (or input frame). The grayscales may include a first color grayscale, a second color grayscale, and a third color grayscale. The first color grayscale may be a grayscale for expressing a first color, the second color grayscale may be a grayscale for expressing a second color, and the third color grayscale may be a grayscale for expressing a third color.

The timing controller 11 may receive a control signal for an image. The control signal may include a horizontal synchronization signal (Hsync), a vertical synchronization signal (Vsync), and a data enable signal. The vertical synchronization signal may include a plurality of pulses, and may indicate that a previous frame period ends and a current frame period begins based on a time point at which each pulse occurs. An interval between adjacent pulses of the vertical synchronization signal may correspond to one frame period. The horizontal synchronization signal may include a plurality of pulses, and may indicate that a previous horizontal period ends and a new horizontal period begins based on a time point at which each pulse occurs. An interval between adjacent pulses of the horizontal synchronization signal may correspond to one horizontal period. The data enable signal may have an enable level for specific horizontal periods and may have a disable level for the remaining periods. When the data enable signal is at the enable level, it may indicate that color grayscales are supplied in corresponding horizontal periods.

The timing controller 11 may provide grayscales rendered or corrected to meet the specifications of the display device 10 to the data driver 12. The timing controller 11 may provide, for example, a clock signal, a scan start signal, and the like to the scan driver 13. The timing controller 11 may provide, for example, a clock signal, an emission stop signal, and the like to the emission driver 15.

The data driver 12 may generate data voltages to be provided to data lines DL1, . . . , DLj, .. . , and DLq using the grayscales and control signals received from the timing controller 11. For example, the data driver 12 may sample the grayscales using a clock signal and apply the data voltages corresponding to the grayscales to the data lines in units of pixel rows. Here, q may be an integer greater than 1, and j may be an integer greater than 0 and less than q.

The scan driver 13 may include first to fourth scan drivers 13GW, 13GB, 13GI, and 13GC. The first scan driver 13GW may provide first scan signals to first scan lines GW1, . . . , GWi, . . . , and GWp. Here, p may be an integer greater than 1, and i may be an integer greater than 0 and less than p. The second scan driver 13GB may provide second scan signals to second scan lines GB1, . . . , GBi, . . . , and GBp. The third scan driver 13GI may provide third scan signals to third scan lines GI1, . . . , GIi, . . . , and GIp. The fourth scan driver 13GC may provide fourth scan signals to fourth scan lines GC1, . . . , GCi, . . . , and GCp.

For example, the first scan driver 13GW may receive at least one scan clock signal and the scan start signal from the timing controller 11 and generate the first scan signals to be provided to the first scan lines GW1 to GWp. The first scan driver 13GW may sequentially provide the first scan signals having a turn-on level pulse to the first scan lines GW1 to GWp. For example, the first scan driver 13GW may be configured in the form of a shift register and may generate the first scan signals by sequentially transmitting the scan start signal in the form of a turn-on level pulse to the next scan stage under the control of the scan clock signal.

Since each of the second scan driver 13GB, the third scan driver 13GI, and the fourth scan driver 13GC may be configured similarly to the first scan driver 13GW, redundant descriptions thereof will be omitted. According to an embodiment, at least some of the first to fourth scan drivers 13GW, 13GB, 13GI, and 13GC may be integrated.

The emission driver 15 may receive at least one emission clock signal and the emission stop signal from the timing controller 11 and generate emission signals to be provided to emission lines EM1, . . . , EMi, . . . , and EMp. The emission driver 15 may sequentially provide the emission signals having a turn-off level pulse to the emission lines EM1 to EMp. For example, the emission driver 15 may be configured in the form of a shift register and may generate the emission signals by sequentially transmitting the emission stop signal in the form of a turn-off level pulse to the next emission stage under the control of the emission clock signal.

In FIG. 1, the number of each of the first scan lines GW1 to GWp, the second scan lines GB1 to GBp, the third scan lines GI1 to GIp, the fourth scan lines GC1 to GCp, and the emission lines EM1 to EMp is shown as p. However, embodiments are not limited thereto. For example, in an embodiment, the number of at least one of the second scan lines GB1 to GBp, the third scan lines GI1 to GIp, the fourth scan lines GC1 to GCp, and the emission lines EM1 to EMp may be p/2 or less. For example, two adjacent pixel rows may share one second scan line. Similarly, two adjacent pixel rows may share one third scan line, one fourth scan line, or one emission line. The same pixel row may mean pixels connected to the same first scan line.

The display panel 14 may include a plurality of pixels PXij. Each pixel PXij may be connected to a corresponding data line DLj, corresponding scan lines GWi, GBi, GIi, and GCi, and a corresponding emission line EMi. Each pixel PXij may include a light-emitting element that emits light based on a received data voltage.

The display panel 14 may include first pixels that emit light of the first color, second pixels that emit light of the second color, and third pixels that emit light of the third color. The first color, the second color, and the third color may be different colors. For example, the first color may be one of red, green, and blue, the second color may be one of red, green, and blue other than the first color, and the third color may be one of red, green, and blue other than the first color and the second color. In addition, magenta, cyan, and yellow may be used instead of red, green, and blue as the first to third colors.

The display panel 14 may be arranged in various shapes such as, for example, diamond PENTILE™, RGB-Stripe, S-stripe, Real RGB, or normal PENTILE™.

As described above, the emission driver 15 may provide the emission signals that control light emitting periods of the pixels. In this case, the emission signal adjustment circuit 16 may adjust at least one of the waveform and timing of the emission signals. Accordingly, the emission signal adjustment circuit 16 may alleviate or prevent the band mura (band mura phenomenon) by alleviating the capacitive coupling phenomenon between the emission signals and other signals.

For example, the emission signal adjustment circuit 16 may adjust the emission signals based on a maximum luminance of the display device 10 and grayscales of the input image. The maximum luminance may be the luminance of light emitted from pixels set to a maximum grayscale. For example, the maximum luminance may be the luminance of white light generated when all pixels in the display panel 14 emit light corresponding to the white grayscale. The unit of luminance may be a Nit. The maximum luminance may also be referred to as a display brightness value. This maximum luminance may be set manually by a user of the display device 10, or may be set automatically by an algorithm linked to a light sensor or the like. For example, a maximum value of the maximum luminance may be about 2175 nits, and a minimum value may be about 4 nits. The maximum and minimum values of the maximum luminance may be set differently depending on a product.

For example, according to embodiments, the emission signal adjustment circuit 16 may modify the emission signals based on the observed maximum luminance levels of the display device 10 as well as the grayscale values of the images it processes. The term "maximum luminance" may refer to the highest light output measurable from the pixels when they are set to their brightest setting, often represented as white light. This luminance is commonly measured in Nits, a unit of brightness. Depending on user settings or predefined algorithms, which may include input from ambient light sensors, this maximum luminance can be manually or automatically adjusted. For example, the luminance range might span from about 4 nits at its dimmest to about 2175 nits at its brightest, although these values can vary based on specific product configurations.

Even with the same grayscale, the luminance of light emitted from a pixel may vary depending on the maximum luminance. For example, when the maximum luminance varies, the duty ratio of the emission signals may vary. For example, when the maximum luminance varies, different data voltages may be applied for the same grayscale. For example, changes in the duty ratio of the emission signals and changes in the data voltage may be applied simultaneously.

The specific structure and operation of the emission signal adjustment circuit 16 will be described in further detail below with reference to FIG. 11.

Figure 2:
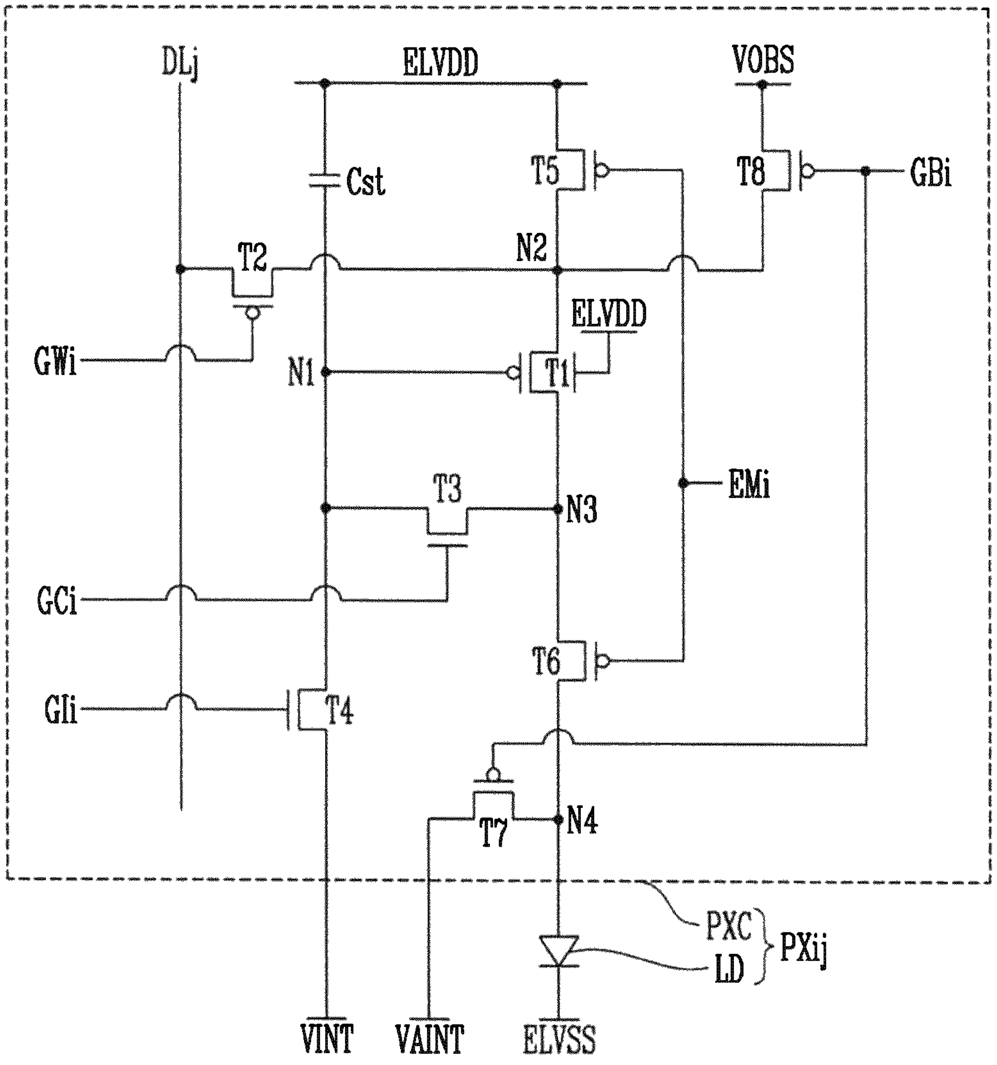
FIG. 2 is a diagram illustrating a pixel according to an embodiment of the present inventive concept.
Figure 3:
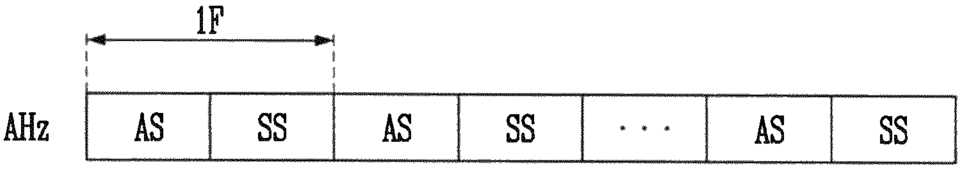
FIGS. 3 to 6 are diagrams illustrating changes in display frequency according to an embodiment of the present inventive concept.

FIG. 2 is a diagram illustrating a pixel according to an embodiment of the present inventive concept.

Referring to FIG. 2, a pixel PXij may include a pixel circuit PXC and a light-emitting element LD. The pixel circuit PXC may include transistors T1, T2, T3, T4, T5, T6, T7, and T8, and a storage capacitor Cst.

The pixel PXij may be located in an i-th pixel row and a j-th pixel column. The pixel PXij may be a first pixel for expressing the first color. A second pixel for expressing the second color and a third pixel for expressing the third color may be configured in the same manner as the first pixel, and therefore, duplicate descriptions thereof will be omitted.

P-type transistors may be polysilicon semiconductor transistors. In a polysilicon semiconductor transistor, a channel of an active layer may include a polysilicon semiconductor. For example, the polysilicon semiconductor transistor may be a low-temperature polysilicon (LTPS) thin film transistor. The polysilicon semiconductor transistor may have high electron mobility, and thus, may have fast driving characteristics.

N-type transistors may be oxide semiconductor transistors. In an oxide semiconductor transistor, a channel of an active layer may include an oxide semiconductor. For example, the oxide semiconductor transistor may be a low-temperature polycrystalline oxide (LTPO) thin film transistor. The oxide semiconductor transistor may have lower charge mobility than the polysilicon semiconductor transistor. Accordingly, in a turned-off state, the oxide semiconductor transistors may have a smaller leakage current than the polysilicon semiconductor transistors.

A first transistor T1 may have a gate electrode connected to a first node N1, a first electrode connected to a second node N2, and a second electrode connected to a third node N3. The first transistor T1 may be a driving transistor. The first transistor T1 may be a P-type transistor. According to an embodiment, the first transistor T1 may include a sub-gate electrode (back gate electrode or body), and the sub-gate electrode may receive a first power source voltage ELVDD. According to an embodiment, the sub-gate electrode of the first transistor T1 may be connected to the gate electrode (that is, the first node). According to an embodiment, the sub-gate electrode of the first transistor T1 may be omitted.

A second transistor T2 may have a gate electrode connected to a first scan line GWi, a first electrode connected to a data line DLj, and a second electrode connected to the second node N2. The second transistor T2 may be a switching transistor. The second transistor T2 may be a P-type transistor.

The first scan driver 13GW may provide a first scan signal that controls the timing at which the pixel PXij receives a data voltage. For example, the second transistor T2 that receives the first scan signal of a turn-on level may be turned on, and the second transistor T2 may apply the data voltage applied to the data line DLj to the second node N2.

A third transistor T3 may have a gate electrode connected to a fourth scan line GCi, a first electrode connected to the first node N1, and a second electrode connected to the third node N3. The third transistor T3 may be a diode-connected transistor. The third transistor T3 may be an N-type transistor.

A fourth transistor T4 may have a gate electrode connected to a third scan line GIi, a first electrode connected to the first node N1, and a second electrode receiving a first initialization voltage VINT. The fourth transistor T4 may be a gate initialization transistor. The fourth transistor T4 may be an N-type transistor.

A fifth transistor T5 may have a gate electrode connected to an emission line EMi, a first electrode receiving the first power source voltage ELVDD, and a second electrode connected to the second node N2. The fifth transistor T5 may be a first emission control transistor. The fifth transistor T5 may be a P-type transistor.

A sixth transistor T6 may have a gate electrode connected to the emission line EMi, a first electrode connected to the third node N3, and a second electrode connected to a fourth node N4. The sixth transistor T6 may be a second emission control transistor. The sixth transistor T6 may be a P-type transistor.

A seventh transistor T7 may have a gate electrode connected to a second scan line GBi, a first electrode receiving a second initialization voltage VAINT (or anode initialization voltage), and a second electrode connected to the fourth node N4. The seventh transistor T7 may be an anode initialization transistor. The seventh transistor T7 may be a P-type transistor.

The second scan driver 13GB may provide a second scan signal that controls the timing at which the second initialization voltage VAINT (or anode initialization voltage) is applied to an anode electrode of the light-emitting element LD. For example, the seventh transistor T7 that receives the second scan signal of a turn-on level may be turned on, and the second initialization voltage VAINT may be applied to the anode electrode of the light-emitting element LD, so that an anode voltage of the light-emitting element LD may be initialized to the second initialization voltage VAINT.

An eighth transistor T8 may have a gate electrode connected to the second scan line GBi, a first electrode receiving a bias voltage VOBS, and a second electrode connected to the second node N2. The eighth transistor T8 may be a bias transistor. The eighth transistor T8 may be a P-type transistor.

The storage capacitor Cst may have a first electrode that receives the first power source voltage ELVDD and a second electrode connected to the first node N1.

The light-emitting element LD may have the anode electrode connected to the fourth node N4 and a cathode electrode receiving a second power source voltage ELVSS. The light-emitting element LD may emit light of one of the first color, the second color, and the third color. The light-emitting element LD may be a light-emitting diode. For example, the light-emitting element LD may be composed of an organic light-emitting diode, an inorganic light-emitting diode, a quantum dot/well light-emitting diode, or the like. In an embodiment, only one light-emitting element LD is provided in each pixel. However, embodiments are not limited thereto. For example, according to embodiments, a plurality of light-emitting elements may be provided in each pixel. In this case, the plurality of light-emitting elements may be connected in series, in parallel, or in series and in parallel.

FIGS. 3 to 6 are diagrams illustrating changes in display frequency according to an embodiment of the present inventive concept.

The display device 10 may support a variable refresh rate. A refresh rate may be the frequency at which the data voltage is written to the pixel PXij, may also be referred to as a screen scan rate or screen refresh rate, and may indicate the number of image frames displayed per second.

Figure 4:
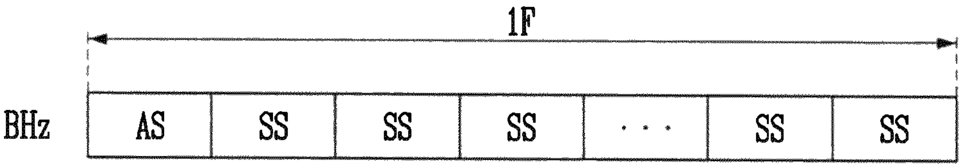

The display panel 14 may display an image at a first frequency AHz in a first mode (see FIG. 3), and may display an image at a second frequency BHz lower than the first frequency AHz in a second mode (see FIG. 4).

For example, in the first mode, each frame period 1F may include one address scan period AS and one self-scan period SS for each pixel PXij. For example, in the second mode, each frame period 1F may include one address scan period AS and a plurality of self-scan periods SS for each pixel PXij. As the second frequency BHz decreases, the number of self-scan periods SS included in one frame period 1F may increase. For example, in a specific mode, each frame period 1F may include only one address scan period AS for each pixel PXij and may not include the self-scan period SS.

The address scan period AS may be a period during which the data voltage is written to the pixel PXij. The address scan period AS may also be referred to as a data programming period during which the data voltage is received from the data line DLj.

The self-scan period SS may be a period during which the data voltage is not written to the pixel PXij. During a light emitting period of the self-scan period SS, the pixel PXij may emit light using the data voltage written in the address scan period AS. For example, the length of the self-scan period SS may be the same as the length of the address scan period AS.

Figure 5:
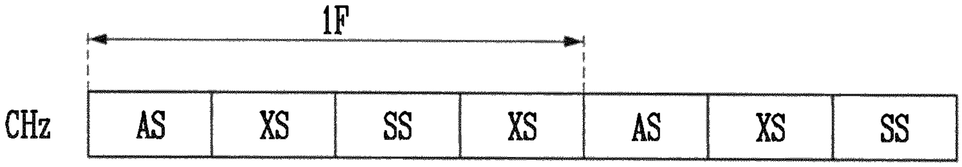
Figure 6:
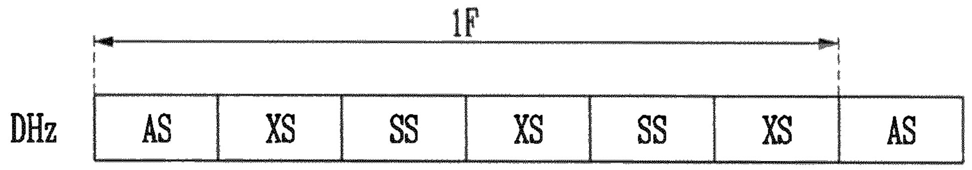

The display panel 14 may display an image at a third frequency CHz in a third mode (see FIG. 5), and may display an image at a fourth frequency DHz lower than the third frequency CHz in a fourth mode (see FIG. 6).

In the third and fourth modes, an auxiliary scan period XS following the address scan period AS and an auxiliary scan period XS following the self-scan period SS may be included.

The auxiliary scan period XS may be similar to the self-scan period SS in that it is a period during which the data voltage is not written to the pixel PXij. During a light emitting period of the auxiliary scan period XS, the pixel PXij may emit light using the data voltage written in the address scan period AS. For example, the length of the auxiliary scan period XS may be the same as the length of the address scan period AS. However, the auxiliary scan period XS may differ from the self-scan period SS in that the second scan signal of the turn-on level is not supplied. This is described in further detail below with reference to FIGS. 8 and 9.

The display device 10 is not limited to having to be driven to include all of the first mode, the second mode, the third mode, and the fourth mode. The display device 10 may be driven in at least one of the first mode, the second mode, the third mode, and the fourth mode. For example, in an embodiment, the display device 10 may be driven in only one of the first mode, the second mode, the third mode, and the fourth mode. In an embodiment, the display device 10 may be driven only in the first mode and the second mode, and not in the third mode and the fourth mode. In an embodiment, the display device 10 may be driven only in the third mode and the fourth mode, and not in the first mode and the second mode.

Figure 7:
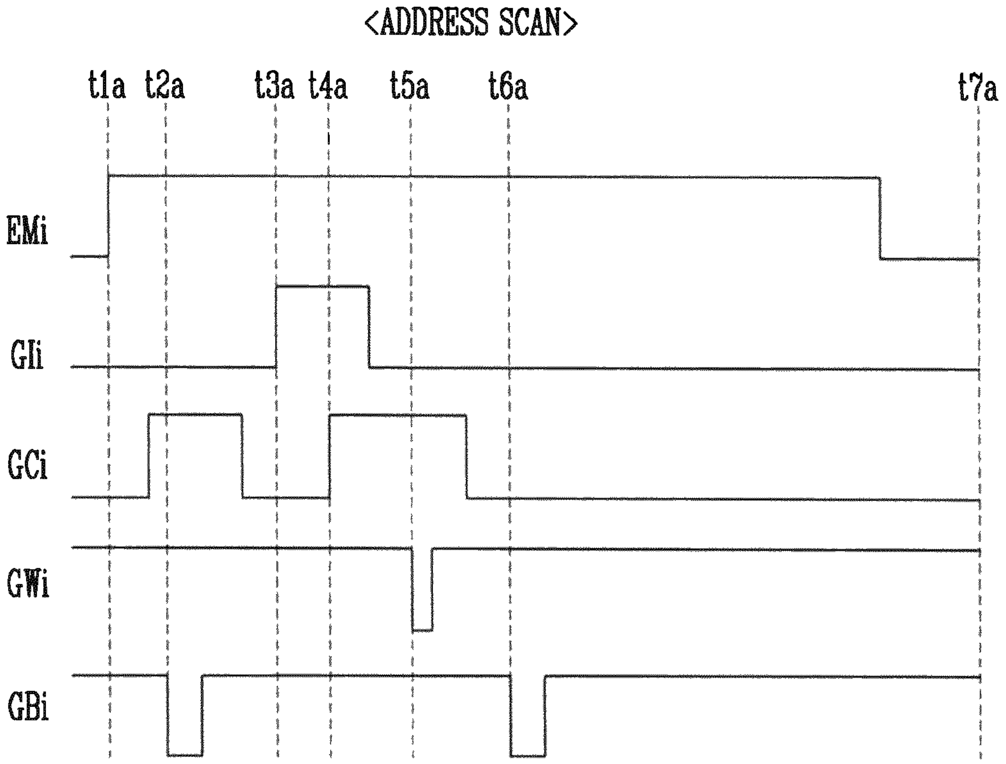
FIG. 7 is a diagram illustrating an address scan period according to an embodiment of the present inventive concept.

FIG. 7 is a diagram illustrating an address scan period according to an embodiment of the present inventive concept. In describing FIG. 7, reference will be made to the pixel PXij of FIG. 2.

At a time point t1*a*, by applying an emission signal of a turn-off level (high level) to the emission line EMi, the fifth transistor T5 and the sixth transistor T6 may be turned off, and the pixel PXij may be in a non-light emitting state.

At a time point t2*a*, by applying a second scan signal of a turn-on level (low level) to the second scan line GBi, the seventh transistor T7 and the eighth transistor T8 may be turned on. In addition, by applying a fourth scan signal of a turn-on level (high level) to the fourth scan line GCi, the third transistor T3 may be turned on. In this case, by applying the bias voltage VOBS higher than a voltage of the gate electrode (first node N1) to the source electrode (second node N2) of the first transistor T1, the first transistor T1 may be on-biased. When the first transistor T1 is on-biased, the data voltage of the current frame input thereafter may be lower than the bias voltage VOBS. As a result, a hysteresis phenomenon can be prevented regardless of the magnitude of the data voltage in the previous frame.

The hysteresis phenomenon may refer to the phenomenon in which a source-drain current curve versus a gate-source voltage of a transistor when the data voltage of the current frame is higher than the data voltage of the previous frame becomes different from a source-drain current curve versus a gate-source voltage of a transistor when the data voltage of the current frame is lower than the data voltage of the previous frame.

At a time point t3*a*, by applying a third scan signal of a turn-on level (high level) to the third scan line GIi, the fourth transistor T4 may be turned on. Accordingly, the first initialization voltage VINT may be applied to the first node N1. The first initialization voltage VINT may be a sufficiently low voltage to turn on the first transistor T1.

At a time point t4*a*, by applying the fourth scan signal of the turn-on level (high level) to the fourth scan line GCi, the third transistor T3 may be turned on. Accordingly, the first transistor T1 may be connected in the form of a diode in which the drain electrode and the gate electrode are connected to each other.

At a time point t5*a*, by applying a scan signal of a turn-on level (low level) to the first scan line GWi, the second transistor T2 may be turned on. Accordingly, the data voltage of the data line DLj may be applied to the first node N1 through the second transistor T2, the first transistor T1, and the third transistor T3 that are in a turned-on state. In this case, a voltage of the first node N1 may be a compensation voltage obtained by subtracting a threshold voltage of the first transistor T1 from the data voltage. The storage capacitor Cst may maintain a voltage difference between the first power source voltage ELVDD and the compensation voltage.

At a time point t6*a*, by applying the scan signal of the turn-on level (low level) to the second scan line GBi, the seventh transistor T7 and the eighth transistor T8 may be turned on. As the seventh transistor T7 is turned on, the second initialization voltage VAINT may be applied to the anode electrode of the light-emitting element LD, and the light-emitting element LD may be initialized with a charge amount corresponding to a voltage difference between the second initialization voltage VAINT and the second power source voltage ELVSS. Accordingly, low grayscale expression in the light-emitting element LD may be facilitated.

At a time point t7*a*, by applying an emission signal of a turn-on level (low level) to the emission line EMi, the fifth transistor T5 and the sixth transistor T6 may be turned on. Accordingly, a path of driving current flowing from the first power source voltage ELVDD to the second power source voltage ELVSS via the fifth transistor T5, the first transistor T1, the sixth transistor T6, and the light-emitting element LD may be formed.

The amount of driving current may be controlled according to the voltage maintained in the storage capacitor Cst. The light-emitting element LD may emit light with a luminance corresponding to the amount of driving current. The light-emitting element LD may emit light until the emission signal of the turn-off level is applied to the emission line EMi.

Figure 8:
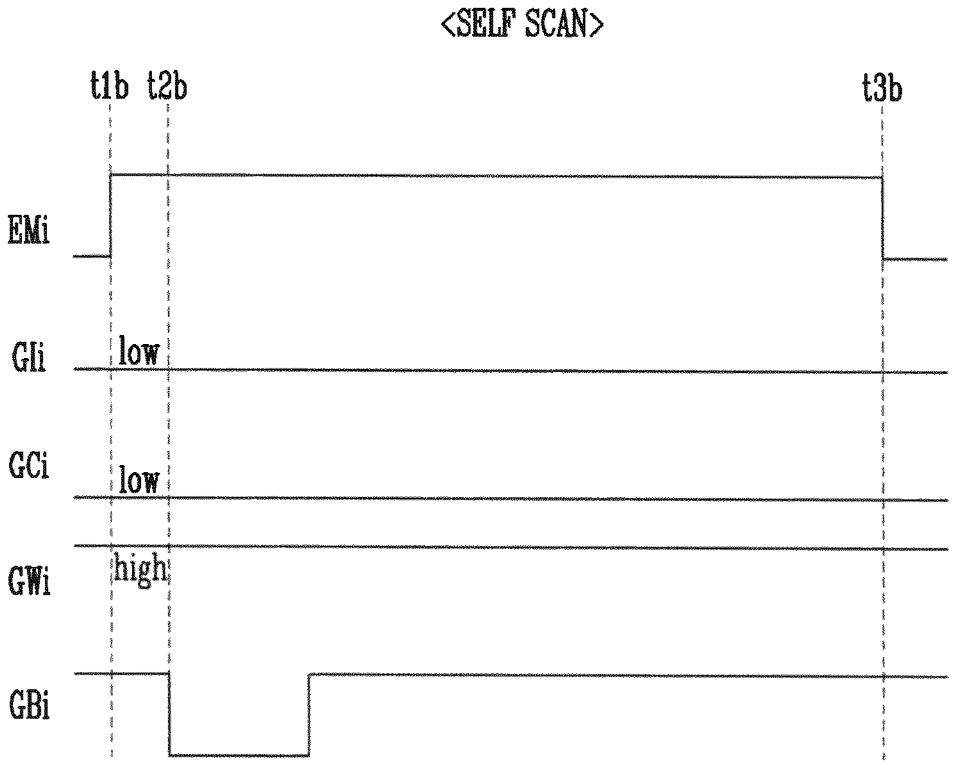
FIG. 8 is a diagram illustrating a self-scan period according to an embodiment of the present inventive concept.

FIG. 8 is a diagram illustrating a self-scan period according to an embodiment of the present inventive concept. In describing FIG. 8, reference will be made to the pixel PXij of FIG. 2.

At a time point t1*b*, by applying an emission signal of a turn-off level (high level) to the emission line EMi, the fifth transistor T5 and the sixth transistor T6 may be turned off, and the pixel PXij may be in a non-light emitting state.

During the self-scan period t1*b* to t3*b*, scan signals of a turn-off level may be maintained in the first scan line GWi, the third scan line GIi, and the fourth scan line GCi. Therefore, the voltage of the first node N1 may not change.

At a time point t2*b*, by applying a scan signal of a turn-on level (low level) to the second scan line GBi, the seventh transistor T7 and the eighth transistor T8 may be turned on. As the seventh transistor T7 is turned on, the second initialization voltage VAINT may be applied to the anode electrode of the light-emitting element LD, and the light-emitting element LD may be initialized with a charge amount corresponding to the voltage difference between the second initialization voltage VAINT and the second power source voltage ELVSS. Accordingly, low grayscale expression in the light-emitting element LD may be facilitated.

At a time point t3*b*, by applying an emission signal of a turn-on level (low level) to the emission line EMi, the fifth transistor T5 and the sixth transistor T6 may be turned on. Accordingly, a path of driving current flowing from the first power source voltage ELVDD to the second power source voltage ELVSS via the fifth transistor T5, the first transistor T1, the sixth transistor T6, and the light-emitting element LD may be formed.

The amount of driving current may be controlled according to the voltage maintained in the storage capacitor Cst. Since the voltage of the first node N1 written during the address scan period AS may be maintained during the self-scan period SS, the luminance of the light-emitting element LD during the self-scan period SS may be the same as the luminance of the light-emitting element LD during the address scan period AS.

Figure 9:
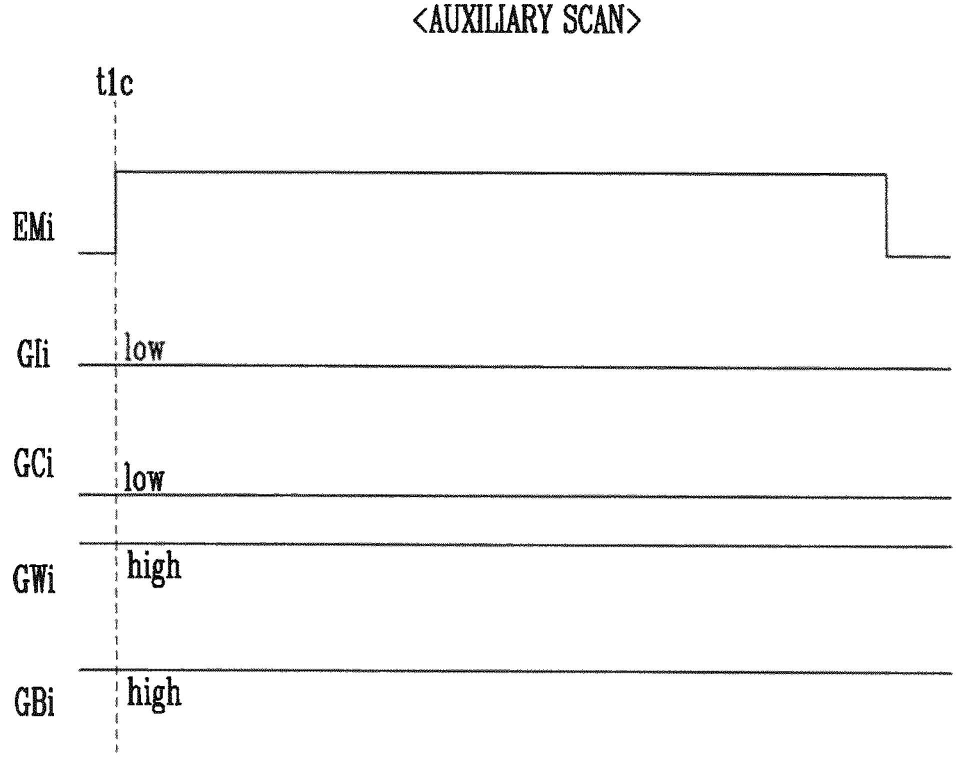
FIG. 9 is a diagram illustrating an auxiliary scan period according to an embodiment of the present inventive concept.

FIG. 9 is a diagram illustrating an auxiliary scan period according to an embodiment of the present inventive concept.

The auxiliary scan period of FIG. 9 may be an example of the auxiliary scan period XS of FIGS. 5 and 6. During the auxiliary scan period of FIG. 9, the emission signal of the emission line EMi may have the same waveform as signals in the address scan period of FIG. 7. However, the first to fourth scan signals may maintain the turn-off level. Accordingly, the voltage of the first node N1 may not change, and a voltage difference between both ends of the storage capacitor Cst may be maintained. Therefore, the luminance of the light-emitting element LD after the auxiliary scan period of FIG. 9 may be the same as the luminance of the light-emitting element LD after the previous address scan period.

Figure 10:
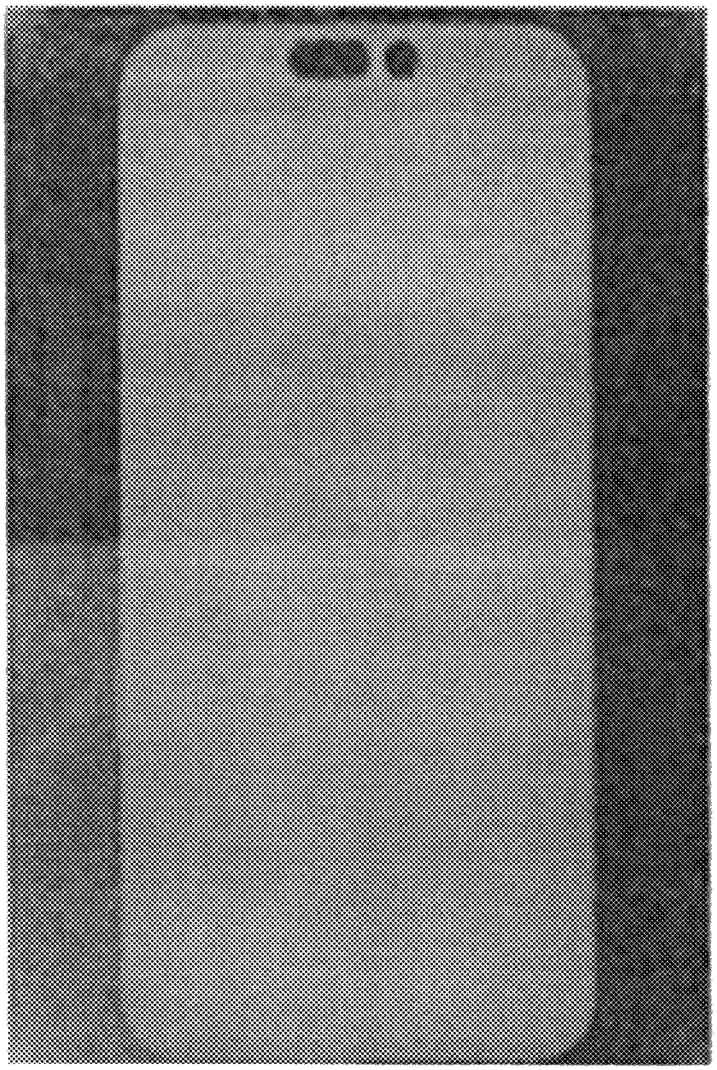
FIG. 10 is a diagram illustrating the band mura phenomenon.

FIG. 10 is a diagram illustrating the band mura phenomenon.

Referring to FIG. 10, it can be seen that the band mura in the form of a horizontal stripe has occurred on the display panel 14. The band mura phenomenon may refer to a type of visual irregularity that appears on display screens, characterized by non-uniformities or streaks of brightness and color across the display. This effect may be particularly noticeable in situations where the screen displays uniform backgrounds, making any inconsistency in brightness or color distribution clearly visible. When the second initialization voltage VAINT is applied to the anode electrode of the light-emitting element LD, the anode voltage may change (see FIG. 2). In this case, the anode electrode of the light-emitting element LD may be in a state of capacitive coupling with the emission line EMi. Therefore, a change in the anode voltage may affect a change in the voltage level of the emission signal, which may lead to the occurrence of the band mura.

The closer the second initialization voltage VAINT (or anode initialization voltage) is to the second power source voltage ELVSS, the more effectively low grayscale values can be displayed. This proximity can help diminish the occurrence of "black lifting," thus improving the display device's 10 ability to accurately render darker images.

The greater the difference value between the second initialization voltage VAINT and the second power source voltage ELVSS, the greater the advantage of increasing the response speed of the pixel PXij and decreasing the temperature sensitivity. However, the greater the difference value between the second initialization voltage VAINT (or anode initialization voltage) and the second power source voltage ELVSS, the greater the change in the anode voltage of the light-emitting element LD, which can have a significant effect on the change in the voltage level of the emission signal.

The difference value between the second initialization voltage VAINT and the second power source voltage ELVSS may be determined in various ways depending on the color of the pixel. For example, the difference value may be set to about 0.15 V for a pixel emitting red light and a pixel emitting green light, and the difference value may be set to about 1.1 V for a pixel emitting blue light. However, this is only an example, and the difference value between the second initialization voltage VAINT and the second power source voltage ELVSS is not limited thereto, and may be set, for example, to be the same or different for all pixels emitting red light, green light, and blue light.

Figure 11:
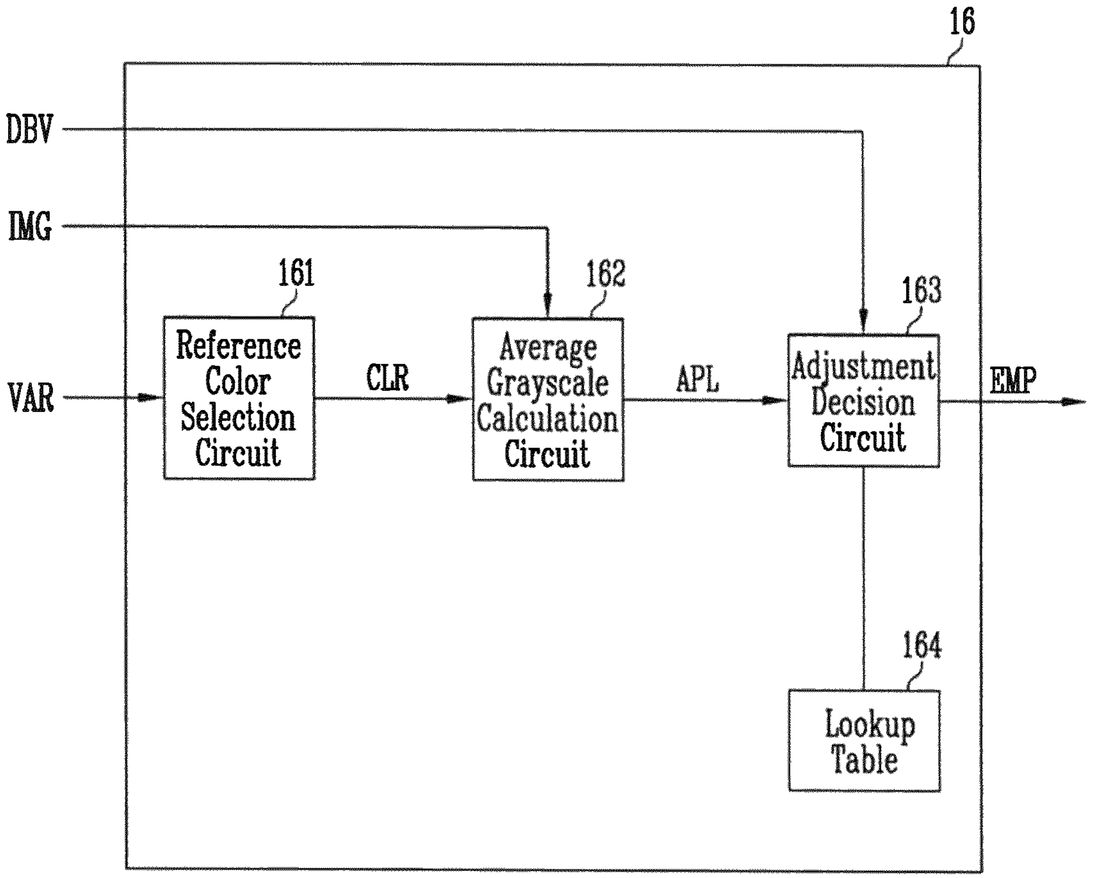
FIG. 11 is a diagram illustrating an emission signal adjustment circuit according to an embodiment of the present inventive concept.
Figure 13:
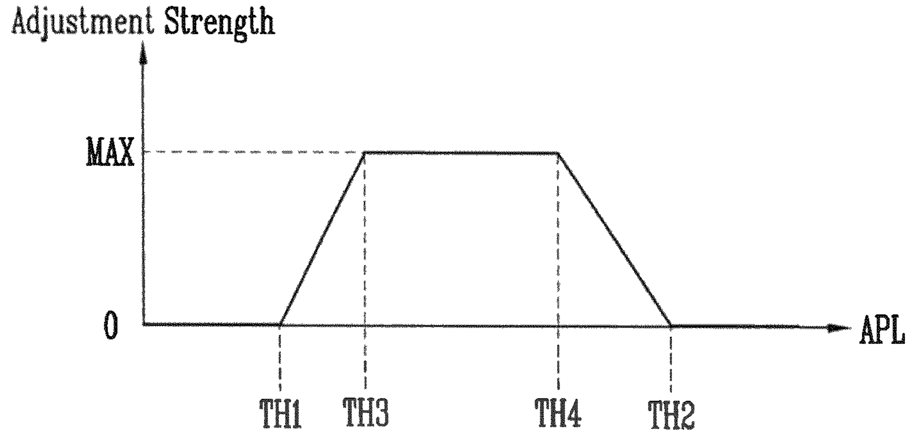
FIGS. 13 to 16 are diagrams illustrating various embodiments of adjustment methods employed by the emission signal adjustment circuit of FIG. 11.

FIG. 11 is a diagram illustrating an emission signal adjustment circuit according to an embodiment of the present inventive concept. FIG. 12 is a diagram illustrating a lookup table of the emission signal adjustment circuit of FIG. 11 according to an embodiment of the present inventive concept. FIGS. 13 to 16 are diagrams illustrating various embodiments of adjustment methods employed by the emission signal adjustment circuit of FIG. 11.

Referring to FIG. 11, an emission signal adjustment circuit 16 according to an embodiment of the present inventive concept may include a reference color selection circuit 161, an average grayscale calculation circuit 162, an adjustment decision circuit 163, and a lookup table 164.

The emission signal adjustment circuit 16 may adjust at least one of the waveform and timing of the emission signals. The emission signal adjustment circuit 16 may adjust the emission signals based on a maximum luminance DBV of the display device 10 and grayscales of an input image IMG.

For example, according to embodiments of the present inventive concept, the emission signal adjustment circuit 16 may improve the performance of the display device 10 by modifying the waveform and timing of the emission signals. For example, the emission signal adjustment circuit 16 may adjust these signals to improve the visual quality of the display based on several parameters. For example, the emission signal adjustment circuit 16 may tailor the emission signals in response to the maximum luminance DBV, which represents the highest light output that the display device 10 can achieve under specific conditions. Additionally, the emission signal adjustment circuit 16 may consider the grayscales of any input image IMG to enable the display device 10 to accurately reproduce the intended shades and contrasts.

By adjusting the waveform, the emission signal adjustment circuit 16 can change the shape of the signal that is sent to the display device's 10 light-emitting components, which may help in fine-tuning the intensity and color output of the light. Timing adjustments may also be made to allow for these signals to be synchronized properly with the display device's 10 refresh rate and other operational timings, which may prevent or reduce visual artifacts like flickering or ghosting.

These adjustments made by the emission signal adjustment circuit 16 may enable the display device 10 to provide improved visual clarity and color accuracy, adapting dynamically to changes in the content being displayed or variations in environmental lighting conditions, thereby leading to a consistently high-quality viewing experience, regardless of the complexity of the content or display settings.

The reference color selection circuit 161 may select a reference color CLR based on a difference value VAR between the second initialization voltage VAINT and the second power source voltage ELVSS. For example, the second power source voltage ELVSS may be commonly applied to cathode electrodes of light-emitting elements LD of all pixels. As described above with reference to FIG. 10, the larger the difference value VAR, the more significant the impact of the second initialization voltage VAINT on changes in the voltage level of the emission signal. Accordingly, the reference color selection circuit 161 may select the color of the pixel with the large difference value VAR as the reference color CLR.

In an embodiment, the reference color selection circuit 161 may select a predetermined color as the reference color CLR regardless of the difference value VAR. This is because, depending on the type of display device 10, there may be other factors affecting the change in the voltage level of the emission signal in addition to the difference value VAR.

The average grayscale calculation circuit 162 may calculate an average grayscale APL by calculating an average value of grayscales corresponding to the reference color CLR among the input image IMG. For example, when the reference color CLR is blue, an average value of grayscales corresponding to a blue pixel among the input image IMG may be the average grayscale APL. However, an arithmetic mean is not necessarily used in these calculations, and the average grayscale calculation circuit 162 may calculate the average grayscale APL in various ways, such as, for example, by applying weights according to the location of pixels on the display panel.

The adjustment decision circuit 163 may determine whether to adjust the emission signals based on the average grayscale APL and the maximum luminance DBV. The band mura phenomenon may mainly occur in low-luminance or low-grayscale images. Accordingly, the adjustment decision circuit 163 may determine to adjust the emission signals based on the average grayscale APL and the maximum luminance DBV when the band mura phenomenon is expected in the display panel 14.

In this case, the adjustment decision circuit 163 may refer to the lookup table 164 stored in advance (see FIG. 12). The adjustment decision circuit 163 may determine a first threshold value TH1 and a second threshold value TH2 based on the maximum luminance DBV, and may determine to adjust the emission signals when the average grayscale APL corresponds to a value between the first threshold value TH1 and the second threshold value TH2. For example, when the maximum luminance DBV is about 10 nits, the adjustment decision circuit 163 may determine to adjust the emission signals when the average grayscale APL is greater than about 5 grayscales and less than about 66 grayscales. For example, when the maximum luminance DBV is about 1600 nits, the adjustment decision circuit 163 may determine to adjust the emission signals when the average grayscale APL is greater than about 0 grayscales and less than about 7 grayscales.

In an embodiment, the adjustment decision circuit 163 may determine a difference between the first threshold value TH1 and the second threshold value TH2 to be smaller as the maximum luminance DBV increases. For example, the adjustment decision circuit 163 may set the second threshold value TH2 to be smaller as the maximum luminance DBV increases. This is because, at a higher maximum luminance DBV, the pixel Pxij emits light with higher luminance for the same grayscale.

In an embodiment, the adjustment decision circuit 163 may further determine a third threshold value TH3 and a fourth threshold value TH4 corresponding to values between the first threshold value TH1 and the second threshold value TH2. The third threshold value TH3 may be greater than the first threshold value TH1, the fourth threshold value TH4 may be greater than the third threshold value TH3, and the second threshold value TH2 may be greater than the fourth threshold value TH4. In this case, the adjustment decision circuit 163 may adjust the emission signals to the maximum value when the average grayscale APL corresponds to a value between the third threshold value TH3 and the fourth threshold value TH4. For example, referring to FIG. 13, it can be seen that the adjustment strength is set to a maximum value MAX when the average grayscale APL corresponds to a value between the third threshold value TH3 and the fourth threshold value TH4. The greater the adjustment strength, the greater the change in the waveform or timing of the emission signal, and the smaller the adjustment strength, the less the change in the waveform or timing of the emission signal.

When the average grayscale APL corresponds to a value between the first threshold value TH1 and the third threshold value TH3, the adjustment decision circuit 163 may increase the adjustment strength as the average grayscale APL increases. On the other hand, when the average grayscale APL corresponds to a value between the fourth threshold value TH4 and the second threshold value TH2, the adjustment decision circuit 163 may decrease the adjustment strength as the average grayscale APL increases.

The adjustment decision circuit 163 may generate an adjustment signal EMP that includes information on the adjustment strength and adjustment method. When the adjustment signal EMP is received, the timing controller 11 may control the emission driver 15 with the adjustment strength and adjustment method corresponding thereto. According to an embodiment, the adjustment decision circuit 163 and the timing controller 11 may be configured as a single integrated circuit. According to an embodiment, the adjustment decision circuit 163 may be implemented in software within the timing controller 11.

Figure 14:
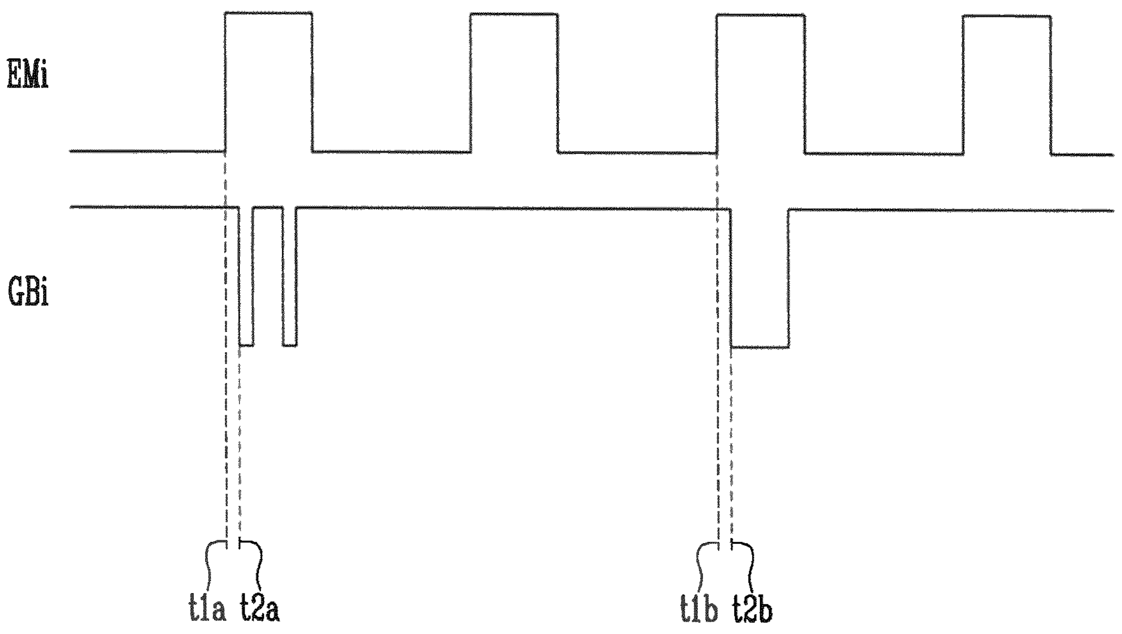
Figure 15:
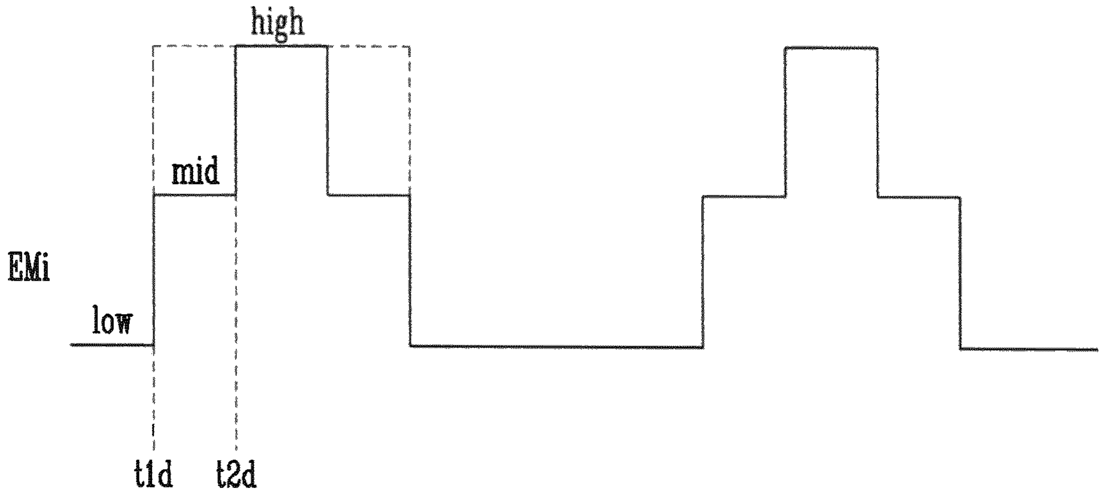
Figure 16:
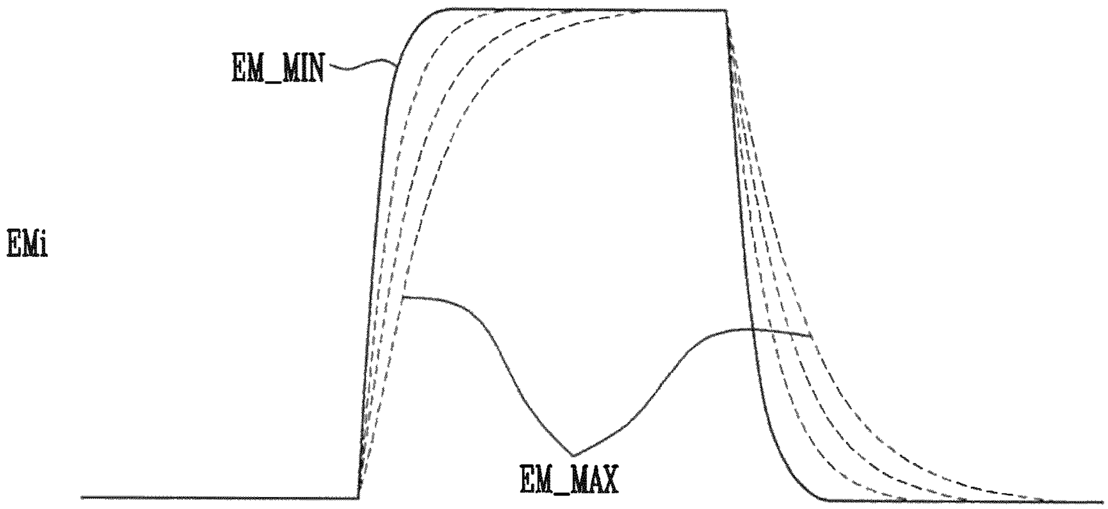

Referring to FIGS. 14 to 16, embodiments of various adjustment methods are shown. According to the embodiments of FIGS. 14 to 16, the band mura phenomenon can be minimized or reduced by adjusting the timing at which the second initialization voltage VAINT is applied to the anode electrode of the light-emitting element LD by the second scan signal of the turn-on level and the timing at which the emission signal of the turn-off level is applied.

The adjustment signal EMP may include information about at least one of the adjustment methods of FIGS. 14 to 16. For example, the adjustment signal EMP may include the possibility of incorporating methods from any single figure, any combination of two figures, or all three figures. Additionally, the adjustment methods detailed in FIGS. 14 to 16 can be implemented simultaneously or in any combination to improve the display performance.

Referring to FIG. 14, an example of waveforms of the emission signal applied to the emission line EMi and the second scan signal applied to the second scan line GBi is shown. In a case of the address scan period AS, the emission signal adjustment circuit 16 may adjust the emission signals so that the time point t1*a* at which the voltage level of the emission signal changes is further away from the time point t2*a* at which the voltage level of the corresponding second scan signal changes (see FIG. 7). For example, the emission signal adjustment circuit 16 may adjust the emission signal so that the phase becomes faster. For example, the emission signal adjustment circuit 16 may adjust the time point at which the emission signal changes to a high level to be earlier than the time point t1*a*. In this case, the greater the adjustment strength, the more the emission signal adjustment circuit 16 may change the phase of the emission signal. Similarly, in a case of the self-scan period SS, the emission signal adjustment circuit 16 may adjust the emission signals so that the time point t1*b* at which the voltage level of the emission signal changes is further away from the time point t2*b* at which the voltage level of the corresponding second scan signal changes (see FIG. 8).

Referring to FIG. 15, the emission driver 15 may sequentially change the emission signal to a first voltage level (low), a second voltage level (mid) greater than the first voltage level (low), and a third voltage level (high) greater than the second voltage level (mid). Thereafter, the emission driver 15 may sequentially change the emission signal to the third voltage level (high), the second voltage level (mid), and the first voltage level (low). By introducing the second voltage level (mid), which is an intermediate voltage level, to the emission signal, the power consumption of the display device 10 may be reduced.

In this case, the emission signal adjustment circuit 16 may adjust the emission signals so that the period t1*d* to t2*d* during which the emission signal is maintained at the second voltage level (mid) increases. The greater the adjustment strength, the more the emission signal adjustment circuit 16 may increase the period t1*d* to t2*d*.

Referring to FIG. 16, the emission signal adjustment circuit 16 may adjust the emission signals so that a slew rate of the emission signal is reduced. The slew rate may be the amount of change in voltage level per unit time. In this case, the greater the adjustment strength, the more the emission signal adjustment circuit 16 may reduce the slew rate. Referring to FIG. 16, an example of the waveform of an unadjusted emission signal EM_MIN and the waveform of an emission signal EM_MAX adjusted with the adjustment strength of the maximum value MAX is shown.

Figure 17:
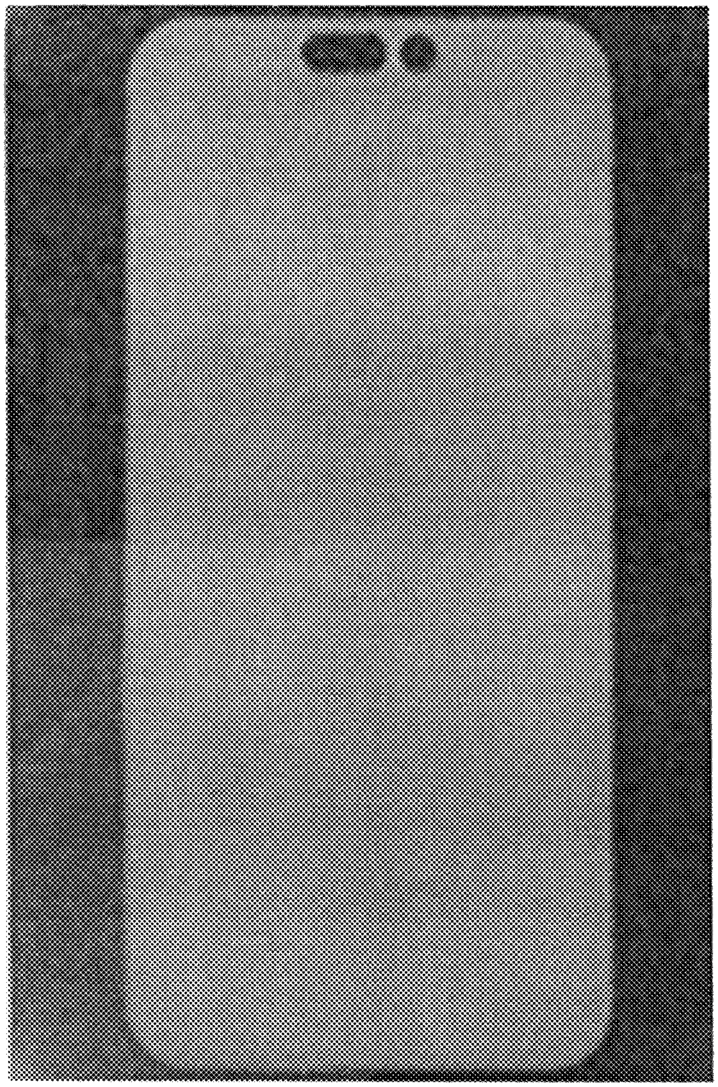
FIG. 17 is a diagram illustrating the improved band mura phenomenon that may be achieved by embodiments of the present inventive concept.

FIG. 17 is a diagram illustrating the improved band mura phenomenon that may be achieved by embodiments of the present inventive concept.

Referring to FIG. 17, a case where the display device 10 including the emission signal adjustment circuit 16 according to an embodiment of the present inventive concept displays an image is shown. Compared to the band mura phenomenon of FIG. 10, it can be seen that the boundary of the band mura is blurred and alleviated in FIG. 17.

Figure 18:
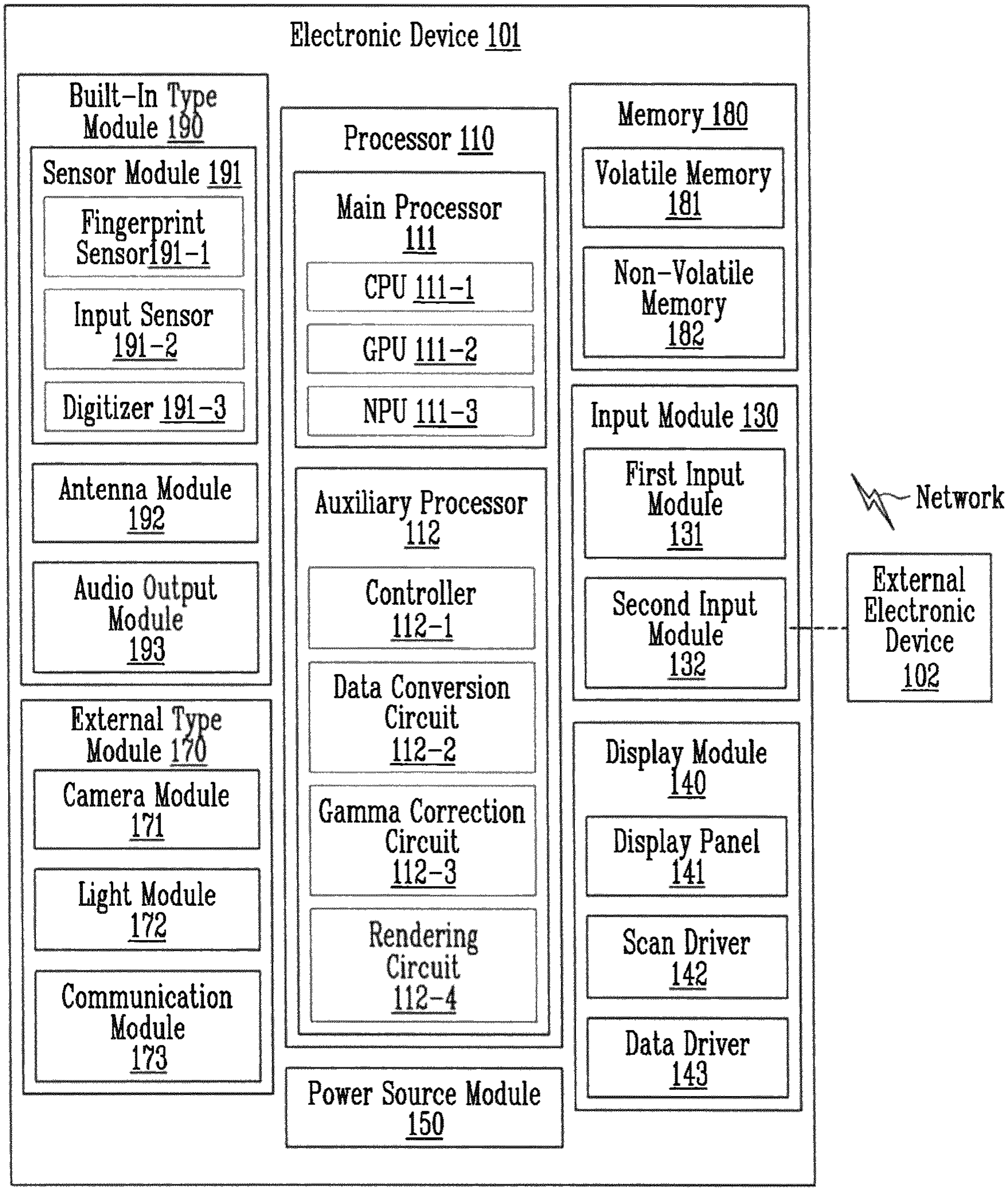
FIG. 18 is a block diagram of an electronic device according to an embodiment of the present inventive concept.

FIG. 18 is a block diagram of an electronic device according to an embodiment of the present inventive concept.

An electronic device 101 may output various information through a display module 140 within an operating system. When a processor 110 executes an application stored in a memory 180, the display module 140 may provide application information to a user through a display panel 141.

The processor 110 may obtain an external input through an input module 130 or a sensor module 191 and execute an application corresponding to the external input. For example, when the user selects a camera icon displayed on the display panel 141, the processor 110 may obtain a user input through an input sensor 191-2 and activate a camera module 171. The processor 110 may transmit image data corresponding to the captured image obtained through the camera module 171 to the display module 140. The display module 140 may display an image corresponding to the captured image through the display panel 141.

In an embodiment, when personal information authentication is executed in the display module 140, a fingerprint sensor 191-1 may obtain input fingerprint information as input data. The processor 110 may compare the input data obtained through the fingerprint sensor 191-1 with authentication data stored in the memory 180, and execute an application according to the comparison result. The display module 140 may display information executed according to the logic of the application through the display panel 141.

In an embodiment, when a music streaming icon displayed on the display module 140 is selected, the processor 110 may obtain a user input through the input sensor 191-2 and activate a music streaming application stored in the memory 180. When a music play command is input from the music streaming application, the processor 110 may activate an audio output module 193 to provide audio information corresponding to the music play command to the user.

In the above description, the operation of the electronic device 101 is briefly described. Below, the configuration of the electronic device 101 will be described in further detail. Some of components of the electronic device 101, which will be described further below, may be integrated and provided as one component, or one component may be provided separately into two or more components.

Referring to FIG. 18, the electronic device 101 may communicate with an external electronic device 102 through a network (for example, a short-range wireless communication network or a long-range wireless communication network). According to an embodiment, the electronic device 101 may include the processor 110, the memory 180, the input module 130, the display module 140, a power source module 150, a built-in type module 190, and an external type module 170. According to an embodiment, in the electronic device 101, at least one of the components described above may be omitted, or one or more additional components may be added. According to an embodiment, some of the components (for example, the sensor module 191, an antenna module 192, or the audio output module 193) may be integrated into another component (for example, the display module 140).

The processor 110 may execute software to control at least one other component (for example, hardware or software component) of the electronic device 101 connected to the processor 110 and perform various data processing or operations. According to an embodiment, as at least part of the data processing or operations, the processor 110 may store a command or data received from other components (for example, the input module 130, the sensor module 191, or a communication module 173) in a volatile memory 181, process the command or data stored in the volatile memory 181, and store the resulting data in a non-volatile memory 182.

The processor 110 may include a main processor 111 and an auxiliary processor 112. The main processor 111 may include one or more of a central processing circuit (CPU) 111-1 and an application processor (AP). The main processor 111 may further include one or more of a graphics processing circuit (GPU) 111-2, a communication processor (CP), and an image signal processor (ISP). The main processor 111 may further include a neural network processing circuit (NPU) 111-3. The neural network processing circuit may be a processor specialized in processing artificial intelligence models, and the artificial intelligence models may be created through machine learning. An artificial intelligence model may include a plurality of artificial neural network layers. An artificial neural network may be one of, for example, a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks or a combination of two or more of the above, but is not limited to the examples described above. In addition to a hardware structure, the artificial intelligence model may additionally or alternatively include a software structure. At least two of the above-described processing circuit and processor may be implemented as an integrated component (for example, a single chip), or may be implemented as independent components (for example, a plurality of chips).

The auxiliary processor 112 may include a controller 112-1. The controller 112-1 may include an interface conversion circuit and a timing control circuit. The controller 112-1 may receive an image signal from the main processor 111, convert the data format of the image signal to match the interface specifications with the display module 140, and output image data. The controller 112-1 may output various control signals utilized to drive the display module 140. The display module 140 may display an image based on the image signal.

The auxiliary processor 112 may further include, for example, a data conversion circuit 112-2, a gamma correction circuit 112-3, a rendering circuit 112-4, and the like. The data conversion circuit 112-2 may receive image data from the controller 112-1, compensate for the image data so that an image is displayed at a desired luminance according to the characteristics of the electronic device 101 or user's settings, or convert the image data to reduce power consumption or compensate for an afterimage. The gamma correction circuit 112-3 may convert the image data or a gamma reference voltage so that an image displayed on the electronic device 101 has desired gamma characteristics. The rendering circuit 112-4 may receive the image data from the controller 112-1 and render the image data by considering a pixel arrangement of the display panel 1410 applied to the electronic device 101 and the like. At least one of the data conversion circuit 112-2, the gamma correction circuit 112-3, and the rendering circuit 112-4 may be integrated into another component (for example, the main processor 111 or the controller 112-1). At least one of the data conversion circuit 112-2, the gamma correction circuit 112-3, and the rendering circuit 112-4 may also be integrated into a data driver 143, which will be described in further detail below.

The memory 180 may store various data used by at least one component (for example, the processor 110 or the sensor module 191) of the electronic device 101 and input data or output data for the command related thereto. The memory 180 may include at least one of the volatile memory 181 and the non-volatile memory 182.

The input module 130 may receive a command or data to be used in components of the electronic device 101 (for example, the processor 110, the sensor module 191, or the audio output module 193) from outside the electronic device 101 (for example, a user or the external electronic device 102).

The input module 130 may include a first input module 131 through which the command or data is input from the user, and a second input module 132 through which the command or data is input from the external electronic device 102. The first input module 131 may include, for example, a microphone, a mouse, a keyboard, keys (for example, buttons), or a pen (for example, a passive pen or an active pen). The second input module 132 may support a designated protocol that can be connected wired or wirelessly to the external electronic device 102. According to an embodiment, the second input module 132 may include, for example, a high definition multimedia interface (HDMI), a universal serial bus (USB) interface, an SD card interface, or an audio interface. The second input module 132 may include a connector that can be physically connected to the external electronic device 102, for example, an HDMI connector, a USB connector, an SD card connector, or an audio connector (for example, a headphone connector).

The display module 140 may visually provide information to the user. The display module 140 may include the display panel 141, a scan driver 142, and the data driver 143. The display module 140 may further include a window, a chassis, and a bracket to protect the display panel 141.

The display panel 141 may include a liquid crystal display panel, an organic light emitting display panel, or an inorganic light emitting display panel, and the type of the display panel 141 is not particularly limited. The display panel 141 may be a rigid type or a flexible type capable of rolling or folding. The display module 140 may further include a supporter supporting the display panel 141, a bracket, a heat dissipation member, or the like.

The scan driver 142 may be mounted on the display panel 141 as a driving chip. In addition, the scan driver 142 may be integrated into the display panel 141. For example, the scan driver 142 may include an amorphous silicon TFT gate driver circuit (ASG), a low temperature polycrystaline silicon TFT gate driver circuit (LTPS), or an oxide semiconductor TFT gate driver circuit (OSG) built into the display panel 141. The scan driver 1420 may receive a control signal from the controller 112-1 and output scan signals to the display panel 141 in response to the control signal.

The display panel 141 may further include an emission driver. The emission driver may output an emission control signal to the display panel 141 in response to a control signal received from the controller 112-1. The emission driver may be formed separately from the scan driver 142 or may be integrated into the scan driver 142.

The data driver 143 may receive a control signal from the controller 112-1, convert the image data into an analog voltage (for example, a data voltage) in response to the control signal, and then output data voltages to the display panel 141.

The data driver 143 may be integrated into other components (for example, the controller 112-1). Functions of the interface conversion circuit and timing control circuit of the controller 112-1 described above may be integrated into the data driver 143.

The display module 140 may further include, for example, an emission driver, a voltage generation circuit, and the like. The voltage generation circuit may output various voltages utilized to drive the display panel 141.

The power source module 150 may supply power to components of the electronic device 101. The power source module 150 may include a battery that charges a power source voltage. The battery may include, for example, a non-rechargeable primary cell, a rechargeable secondary cell, or a fuel cell. The power source module 150 may include a power management integrated circuit (PMIC). The PMIC may supply an optimized power source to each of the modules described above and the modules described below. The power source module 150 may include a wireless power transmission/reception member electrically connected to the battery. The wireless power transmission/reception member may include a plurality of coil-shaped antenna radiators.

The electronic device 101 may further include the built-in type module 190 and the external type module 170. The built-in type module 190 may include the sensor module 191, the antenna module 192, and the audio output module 193. The external type module 170 may include the camera module 171, a light module 172, and the communication module 173.

The sensor module 191 may detect an input by the user's body or an input by the pen of the first input module 131, and generate an electrical signal or a data value corresponding to the input. The sensor module 191 may include at least one of the fingerprint sensor 191-1, the input sensor 191-2, and a digitizer 191-3.

The fingerprint sensor 191-1 may generate a data value corresponding to the user's fingerprint. The fingerprint sensor 191-1 may include one of an optical fingerprint sensor and a capacitive fingerprint sensor.

The input sensor 191-2 may generate a data value corresponding to coordinate information of the input by the user's body or the input by the pen. The input sensor 191-2 may generate the data value by detecting the amount of change in capacitance caused by the input. The input sensor 191-2 may detect an input by a passive pen or transmit and receive data with an active pen.

The input sensor 191-2 may also measure a bio-signal such as, for example, blood pressure, moisture, or body fat. For example, when a user touches a part of his or her body to a sensor layer or a sensing panel and does not move for a certain period of time, the input sensor 191-2 may detect a bio-signal based on a change in an electric field caused by the part of his or her body and output information desired by the user to the display module 140.

The digitizer 191-3 may generate a data value corresponding to coordinate information of the input by the pen. The digitizer 191-3 may generate the data value by detecting the amount of change in electromagnetic caused by the input. The digitizer 191-3 may detect an input by a passive pen or transmit and receive data with an active pen.

At least one of the fingerprint sensor 191-1, the input sensor 191-2, and the digitizer 191-3 may be implemented as a sensor layer formed on the display panel 141 through a continuous process. The fingerprint sensor 191-1, the input sensor 191-2, and the digitizer 191-3 may be disposed on an upper side of the display panel 141, and any one of the fingerprint sensor 191-1, the input sensor 191-2, and the digitizer 191-3, for example, the digitizer 191-3 may be disposed on a lower side of the display panel 141.

At least two of the fingerprint sensor 191-1, the input sensor 191-2, and the digitizer 191-3 may be formed to be integrated into one sensing panel through the same process. When integrated into one sensing panel, the sensing panel may be disposed between the display panel 141 and a window disposed on the top of the display panel 141. According to an embodiment, the sensing panel may be disposed on the window, and the position of the sensing panel is not particularly limited.

At least one of the fingerprint sensor 191-1, the input sensor 191-2, and the digitizer 191-3 may be built into the display panel 141. That is, at least one of the fingerprint sensor 191-1, the input sensor 191-2, and the digitizer 191-3 may be formed simultaneously through processes of forming elements (for example, a light-emitting element, a transistors, and the like) included in the display panel 1410.

In addition, the sensor module 191 may generate an electrical signal or a data value corresponding to the internal or external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 192 may include one or more antennas for transmitting signals or power to outside of the electronic device 101 or receiving signals or power from outside of the electronic device 101. According to an embodiment, the communication module 173 may transmit a signal to the external electronic device or receive a signal from the external electronic device through an antenna suitable for a communication method. An antenna pattern of the antenna module 192 may be integrated into one component of the display module 140 (for example, the display panel 141), the input sensor 191-2, or the like.

The audio output module 193 may be a device for outputting an audio signal to the outside of the electronic device 101, and may include, for example, a speaker used for general purposes such as multimedia playback or recording playback, and a receiver used exclusively for receiving phone call. According to an embodiment, the receiver may be formed integrally with the speaker or may be formed separately. An audio output pattern of the audio output module 193 may be integrated into the display module 140.

The camera module 171 may capture a still image and a moving image. According to an embodiment, the camera module 171 may include one or more lenses, an image sensor, and an image signal processor. The camera module 171 may further include an infrared camera capable of measuring the presence or absence of the user, the user's location, the user's gaze, and the like.

The light module 172 may provide light. The light module 172 may include a light-emitting diode or a xenon lamp. The light module 172 may operate in conjunction with the camera module 171 or operate independently.

The communication module 173 may support the establishment of a wired or wireless communication channel between the electronic device 101 and the external electronic device 102, and the performance of communication through the established communication channel. The communication module 173 may include, for example, one or both of a wireless communication module such as a cellular communication module, a short-range wireless communication module, or a global navigation satellite system (GNSS) communication module, and a wired communication module such as, for example, a local area network (LAN) communication module or a power line communication module. The communication module 173 may communicate with the external electronic device 102 through a short-range communication network such as, for example, Bluetooth, WiFi direct, or infrared data association (IrDA), or a long-range communication network such as a cellular network, the Internet, or a computer network (for example, a LAN or WAN). The various types of communication modules 173 described above may be implemented as one chip or may be implemented as separate chips.

The input module 130, the sensor module 191, the camera module 171, and the like may be used to control the operation of the display module 140 in conjunction with the processor 110.

The processor 110 may output the command or data to the display module 140, the audio output module 193, the camera module 171, or the light module 172 based on the input data received from the input module 130. For example, the processor 110 may generate the image data in response to the input data applied through a mouse or an active pen and output the image data to the display module 140, or may generate command data in response to the input data and output the command data to the camera module 171 or the light module 172. When the input data is not received from the input module 130 for a predetermined period of time, the processor 110 may change the operation mode of the electronic device 101 to a low power mode or sleep mode to reduce power consumption in the electronic device 101.

The processor 110 may output the command or data to the display module 140, the audio output module 193, the camera module 171, or the light module 172 based on sensing data received from the sensor module 191. For example, the processor 110 may compare authentication data applied by the fingerprint sensor 191-1 with the authentication data stored in the memory 180, and then execute an application according to the comparison result. The processor 110 may execute a command or output corresponding image data to the display module 140 based on sensing data detected by the input sensor 191-2 or the digitizer 191-3. When the sensor module 191 includes a temperature sensor, the processor 110 may receive temperature data about the temperature measured by the sensor module 191 and further perform luminance correction on the image data based on the temperature data.

The processor 110 may receive measurement data about the presence or absence of the user, the user's location, the user's gaze, and the like from the camera module 171. The processor 110 may further perform luminance correction on the image data based on the measurement data. For example, the processor 110, which determines the presence or absence of the user through input from the camera module 171, may output the image data whose luminance has been corrected by the data conversion circuit 112-2 or the gamma correction circuit 112-3 to the display module 140.

Some of the components described above may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (for example, the command or data) with each other. The processor 110 may communicate with the display module 140 through a mutually agreed upon interface. For example, any one of the above-described communication methods may be used, and may not be limited to the above-described communication methods.

The electronic device 101 according to various embodiments disclosed in this specification may be various types of devices. The electronic device 101 may include, for example, at least one of a portable communication device (for example, a smartphone), a computer device, a portable multimedia device, a portable medical device, a camera, a wearable device, and a home appliance device. The electronic device 101 according to the embodiments disclosed in this specification is not limited to the above-described devices.

Figure 19:
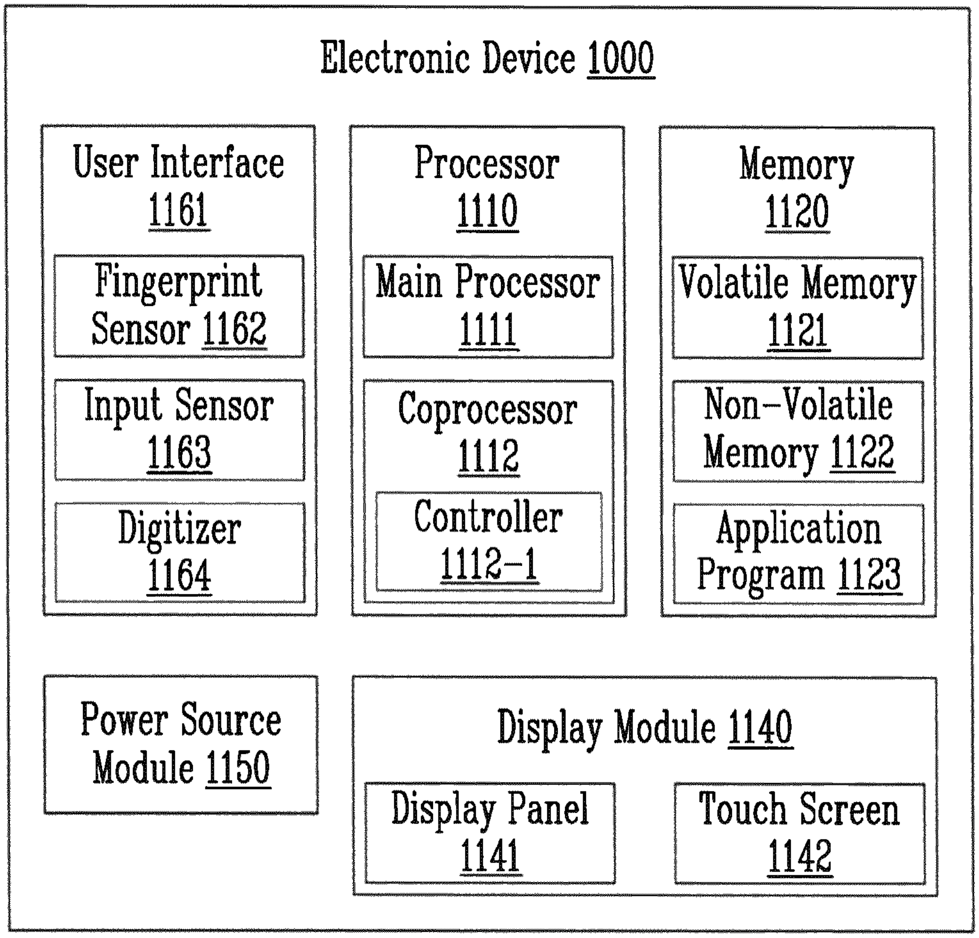
FIG. 19 is a diagram illustrating an electronic device according to an embodiment of the present inventive concept.

FIG. 19 is a diagram illustrating an electronic device according to an embodiment of the present inventive concept.

Referring to FIG. 19, the electronic device 1000 according to an embodiment of the present disclosure may output various information (e.g., images, text, music, etc.) through a display module 1140, which, for example, may correspond to the display device 10 described above. When a processor 1110 executes an application stored in a memory 1120, the display module 1140 may provide application information to a user through a display panel 1141.

In some embodiments, the electronic device 1000 may be configured as, for example, a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as, for example, productivity tools, multimedia streaming and playback, file or mail deliveries or communication services. The application program 1123 interacts seamlessly with the user interface 1161 or touch screen 1142, allowing a user to launch, navigate, and utilize the program through user inputs such as, for example, touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

In an embodiment, when a user wishes to make a phone call, the user taps the telephone icon displayed on the display module 1140, and the processor 1110 may execute a phone application program stored in the memory 1120. A telephone keypad may be presented on the display panel 1141 for the user to enter a phone number to call.

In an embodiment, the display module 1140 may be integrated into an electronic device 1000, such as, for example, a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device 10 described above.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as, for example, blood pressure, moisture, or body mass.

The input sensor 1163 may sense user interactions including, for example, touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include, for example, a liquid crystal display panel, an organic light emitting display panel, or an inorganic light emitting display panel. However, the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display device 10 described above.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power to each of the components described above including the display module 1140.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

A display device, a driving method, and an electronic device according to embodiments of the present inventive concept may alleviate the band mura phenomenon.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display device, comprising:

a plurality of pixels;

an emission driver configured to provide emission signals that control light emitting periods of the pixels; and an emission signal adjustment circuit configured to adjust at least one of a waveform of the emission signals and a timing of the emission signals, wherein the emission signal adjustment circuit adjusts the at least one of the waveform of the emission signals and the timing of the emission signals based on a maximum luminance of the display device and grayscales of an input image.

2. The display device of claim 1, wherein the pixels include light-emitting elements, wherein the display device further includes a scan driver configured to provide scan signals that control a timing at which an anode initialization voltage is applied to anode electrodes of the light-emitting elements, wherein the emission signal adjustment circuit adjusts the emission signals such that a time point at which a voltage level of an emission signal among the emission signals changes is further away from a time point at which a voltage level of a corresponding scan signal changes.

3. The display device of claim 1, wherein the emission driver sequentially changes an emission signal among the emission signals to a first voltage level, a second voltage level greater than the first voltage level, and a third voltage level greater than the second voltage level, wherein the emission signal adjustment circuit adjusts the emission signal such that a period during which the emission signal is maintained at the second voltage level increases.

4. The display device of claim 1, wherein the emission signal adjustment circuit adjusts the emission signals such that a slew rate of an emission signal among the emission signals is reduced.

5. The display device of claim 1, wherein the emission signal adjustment circuit includes:
a reference color selection circuit configured to select a reference color based on a difference value between an anode initialization voltage and a power source voltage applied to a cathode electrode of light-emitting elements of the pixels.

6. The display device of claim 5, wherein the emission signal adjustment circuit further includes:
an average grayscale calculation circuit configured to calculate an average grayscale by calculating an average value of grayscales corresponding to the reference color among the input image.

7. The display device of claim 6, wherein the emission signal adjustment circuit further includes:
an adjustment decision circuit configured to determine whether to adjust the emission signals based on the average grayscale and the maximum luminance.

8. The display device of claim 7, wherein the adjustment decision circuit determines a first threshold value and a second threshold value based on the maximum luminance, and adjusts the at least one of the waveform of the emission signals and the timing of the emission signals when the average grayscale corresponds to a value between the first threshold value and the second threshold value.

9. The display device of claim 8, wherein the adjustment decision circuit determines a difference between the first threshold value and the second threshold value to be smaller as the maximum luminance increases.

10. The display device of claim 8, wherein the adjustment decision circuit further determines a third threshold value and a fourth threshold value corresponding to values between the first threshold value and the second threshold value, and adjusts the at least one of the waveform of the emission signals and the timing of the emission signals to a maximum value when the average value corresponds to a value between the third threshold value and the fourth threshold value.

11. A method of driving a display device, comprising:
receiving a maximum luminance of the display device and grayscales of an input image;
adjusting at least one of a waveform of emission signals and a timing of the emission signals based on the maximum luminance and the grayscales; and
providing the emission signals to a plurality of pixels.

12. The method of claim 11, wherein the pixels include light-emitting elements,
wherein the method further includes providing scan signals that control a timing at which an anode initialization voltage is applied to anode electrodes of the light-emitting elements,
wherein adjusting the at least one of the waveform of the emission signals and the timing of the emission signals comprises adjusting the emission signals such that a time point at which a voltage level of an emission signal among the emission signals changes is further away from a time point at which a voltage level of a corresponding scan signal changes.

13. The method of claim 11, wherein an emission signal among the emission signals is sequentially changed to a first voltage level, a second voltage level greater than the first voltage level, and a third voltage level greater than the second voltage level,
wherein adjusting the at least one of the waveform of the emission signals and the timing of the emission signals comprises adjusting the emission signals such that a period during which the emission signal is maintained at the second voltage level increases.

14. The method of claim 11, wherein adjusting the at least one of the waveform of the emission signals and the timing of the emission signals comprises adjusting the emission signals such that a slew rate of an emission signal among the emission signals is reduced.

15. The method of claim 11, wherein adjusting the at least one of the waveform of the emission signals and the timing of the emission signals includes:
selecting a reference color based on a difference value between an anode initialization voltage and a power source voltage applied to a cathode electrode of light-emitting elements of the pixels.

16. The method of claim 15, wherein adjusting at least one of the waveform of the emission signals and the timing of the emission signals further includes:
calculating an average grayscale by calculating an average value of grayscales corresponding to the reference color among the input image.

17. The method of claim 16, wherein adjusting the at least one of the waveform of the emission signals and the timing of the emission signals further includes:
determining whether to adjust the emission signals based on the average grayscale and the maximum luminance.

18. The method of claim 17, wherein determining whether to adjust the emission signals comprises determining a first threshold value and a second threshold value based on the maximum luminance, and the at least one of the waveform of the emission signals and the timing of the emission signals is adjusted when the average grayscale corresponds to a value between the first threshold value and the second threshold value.

19. An electronic device, comprising:
a processor;
a memory having stored application programs for execution by the processor;
a display device, comprising:
a plurality of pixels;
an emission driver configured to provide emission signals that control light emitting periods of the pixels; and
an emission signal adjustment circuit configured to adjust at least one of a waveform of the emission signals and a timing of the emission signals,
wherein the emission signal adjustment circuit adjusts the at least one of the waveform of the emission signals and the timing of the emission signals based on a maximum luminance of the display device and grayscales of an input image; and
a user interface configured to sense user input via touch or cursor select of an icon presented on the display device, wherein the processor is caused to execute one or more of the stored application programs upon receipt of the user input.

20. The electronic device of claim 19, wherein the pixels include light-emitting elements,
wherein the display device further includes a scan driver configured to provide scan signals that control a timing at which an anode initialization voltage is applied to anode electrodes of the light-emitting elements,
wherein the emission signal adjustment circuit adjusts the emission signals such that a time point at which a voltage level of an emission signal among the emission signals changes is further away from a time point at which a voltage level of a corresponding scan signal changes.

* * * * *